US012210627B2

(12) United States Patent
Hasegawa et al.

(10) Patent No.: US 12,210,627 B2
(45) Date of Patent: Jan. 28, 2025

(54) VULNERABILITY INSPECTION DEVICE, VULNERABILITY INSPECTION METHOD, AND VULNERABILITY INSPECTION PROGRAM

(71) Applicant: NIPPON TELEGRAPH AND TELEPHONE CORPORATION, Tokyo (JP)

(72) Inventors: Ayako Hasegawa, Tokyo (JP); Takuya Watanabe, Tokyo (JP); Eitaro Shioji, Tokyo (JP); Mitsuaki Akiyama, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 482 days.

(21) Appl. No.: 17/626,435

(22) PCT Filed: Jul. 12, 2019

(86) PCT No.: PCT/JP2019/027816
§ 371 (c)(1),
(2) Date: Jan. 11, 2022

(87) PCT Pub. No.: WO2021/009820
PCT Pub. Date: Jan. 21, 2021

(65) Prior Publication Data
US 2022/0261482 A1 Aug. 18, 2022

(51) Int. Cl.
*G06F 21/57* (2013.01)
*G06F 21/62* (2013.01)

(52) U.S. Cl.
CPC ............ *G06F 21/577* (2013.01); *G06F 21/62* (2013.01)

(58) Field of Classification Search
CPC . G06F 21/577; G06F 21/62; G06F 2221/2133
(Continued)

(56) References Cited

U.S. PATENT DOCUMENTS 11,062,041 B2 * 7/2021 Kludy ................. G06F 21/6245
2013/0117292 A1 * 5/2013 Axelrod ................. G06Q 10/06
707/E17.014
(Continued)

FOREIGN PATENT DOCUMENTS

JP 2008-299540 A 12/2008
JP 2013161150 A 8/2013

OTHER PUBLICATIONS

Bonneau et al. (2010) "The password thicket: technical and market failures in human authentication on the web" The Ninth Workshop on the Economics of Information Security (WEIS 2010).
(Continued)

*Primary Examiner* — Bryan F Wright

(57) ABSTRACT

In a vulnerability inspection device, an acquisition unit acquires system messages that are displayed in response to input for multiple types of service registration statuses of a user ID that is input to a login-related screen that requires input of the user ID in an account-based online service that issues the user ID. A determination unit uses the system messages that were acquired for the types to determine whether or not the login-related screen has a vulnerability regarding the leakage of user registration status.

8 Claims, 8 Drawing Sheets

(58) Field of Classification Search
USPC .......................................................... 726/25
See application file for complete search history.

(56) References Cited

U.S. PATENT DOCUMENTS

| 2013/0247204 A1* | 9/2013 | Schrecker | H04L 45/306 |
| | | | 726/25 |
| 2021/0365589 A1* | 11/2021 | Qiao | G06F 21/84 |

OTHER PUBLICATIONS

IT Security Center, Information-Technology Promotion Agency (IPA) (2015) "How to Secure Your Website 7th Edition" Mar. 2015 [online] Accessed on: Jun. 14, 2019 <URL : https://www.ipa.go.jp/files/000017316.pdf.

* cited by examiner

| ACCOUNT TYPE | REGISTRATION STATUS | ACCOUNT INFORMATION | VALID FORMAT | VALUE |
|---|---|---|---|---|
| UNREGISTERED ACCOUNT | UNREGISTERED | EMAIL ADDRESS (USER ID) | type="text", maxlength="128" | test_ur@mail.service.co.jp |
| | | BIRTHDAY | type="date" | 1970.01.01 |
| REGISTERED ACCOUNT | REGISTRATION COMPLETE | EMAIL ADDRESS (USER ID) | type="text", maxlength="128" | test_r@mail.service.co.jp |
| | | BIRTHDAY | type="date" | 1970.01.01 |

Fig. 3

| LOGIN-RELATED SCREEN TYPE | URL | INPUT ACCOUNT INFORMATION |
|---|---|---|
| LOGIN | https://www.service.com/login | EMAIL ADDRESS (USER ID), PASSWORD |
| PASSWORD RECOVERY | https://www.service.com/password_recovery | EMAIL ADDRESS (USER ID) |
| NEW ACCOUNT REGISTRATION | https://www.service.com/register | EMAIL ADDRESS (USER ID), PASSWORD, BIRTHDAY |
| ACCOUNT RECOVERY | https://www.service.com/account_recovery | EMAIL ADDRESS (USER ID) |
| ID SEARCH | https://www.service.com/user_search | EMAIL ADDRESS (USER ID) |

| LOGIN-RELATED SCREEN TYPE | SYSTEM MESSAGE FOR UNREGISTERED ACCOUNT | SYSTEM MESSAGE FOR REGISTERED ACCOUNT | SCREEN INSPECTION RESULT |
|---|---|---|---|
| LOGIN | USER ID OR PASSWORD IS INCORRECT | USER ID OR PASSWORD IS INCORRECT | NO VULNERABILITY |
| PASSWORD RECOVERY | NO SUCH USER ID EXISTS | A PASSWORD RESET EMAIL HAS BEEN SENT TO THE INPUT EMAIL ADDRESS | VULNERABILITY |
| ... | ... | ... | ... |

14c

VULNERABILITY INSPECTION DEVICE, VULNERABILITY INSPECTION METHOD, AND VULNERABILITY INSPECTION PROGRAM

CROSS-REFERENCE TO RELATED APPLICATIONS

This application is a U.S. National Stage Application filed under 35 U.S.C. § 371 claiming priority to International Patent Application No. PCT/JP2019/027816, filed on 12 Jul. 2019, the disclosure of which is hereby incorporated herein by reference in its entirety.

TECHNICAL FIELD

The present invention relates to a vulnerability inspection device, a vulnerability inspection method, and a vulnerability inspection program.

BACKGROUND ART

The leakage of a user's personal information from online services has become a social problem. Online service providers are taking various countermeasures to prevent an attacker from logging in illegally by guessing the combination of a user's user ID and password. For example, in addition to strengthening password policies, service providers can implement a combination of various countermeasures such as a limit on the number of login attempts, using account locking, CAPTCHA (Completely Automated Public Turing test to tell Computers and Humans Apart) (or reCAPTCHA), or the like, as well as multi-factor authentication and multi-step authentication.

On the other hand, privacy threats caused by the leakage of user registration status has not generally been recognized. The services registered by a user can indirectly indicate the user's attributes, preferences, orientations, beliefs, circumstances, and the like, and thus can pose a privacy threat. For example, if a user has registered for a dating service for sexual minorities, it can be inferred that the user is a sexual minority. Accordingly, especially with sensitive online services, it is necessary for the registration status, that is to say whether or not a user is registered, to be kept confidential.

Conventionally, in order to prevent the leakage of user registration status, it has been pointed out to service providers to refrain from displaying excessive system messages that indicate the registration status of registered users (see NPL 1 and 2).

CITATION LIST

Non Patent Literature

NPL 1: Joseph Bonneau, Soren Preibusch, "The password thicket: technical and market failures in human authentication on the web", The Ninth Workshop on the Economics of Information Security (WEIS 2010), 2010

NPL 2: "How to make secure websites, Rev. 7", [online], March 2015, Information-technology Promotion Agency (IPA) Security Center, [retrieved Jun. 14, 2019], Internet <URL: https://www.ipa.go.jp/files/000017316.pdf>

SUMMARY OF THE INVENTION

Technical Problem

However, merely prohibiting excessive messages as pointed out in the prior art does not completely prevent the leakage of the registration status of registered users, and it has been difficult to appropriately determine whether or not a service has a vulnerability regarding the leakage of the registration status of registered users of the service. For example, it has not been possible to know what kind of message would result in a vulnerability if displayed.

The present invention has been made in view of the foregoing, and an object of the present invention is to appropriately determine whether or not a service has a vulnerability regarding the leakage of the registration status of registered users of the service.

Means for Solving the Problem

In order to solve the foregoing problems and achieve the object, a vulnerability inspection device according to the present invention includes: an acquisition unit configured to acquire system messages that are displayed in response to input for a plurality of types of service registration statuses of a user ID that is input to a login-related screen that requires input of the user ID in an account-based online service that issues the user ID; and a determination unit configured to, with use of the system messages that were acquired for the types, determine whether or not the login-related screen has a vulnerability regarding leakage of user registration status.

Effects of the Invention

According to the present invention, it is possible to appropriately determine whether or not a service has a vulnerability regarding the leakage of the registration status of registered users of the service.

BRIEF DESCRIPTION OF DRAWINGS

FIG. 2 is a diagram illustrating a data configuration of inspection account information.

FIG. 3 is a diagram illustrating a data configuration of login-related screen information.

FIG. 5 is a diagram for describing processing of a determination unit.

DESCRIPTION OF EMBODIMENTS

Figure 1:
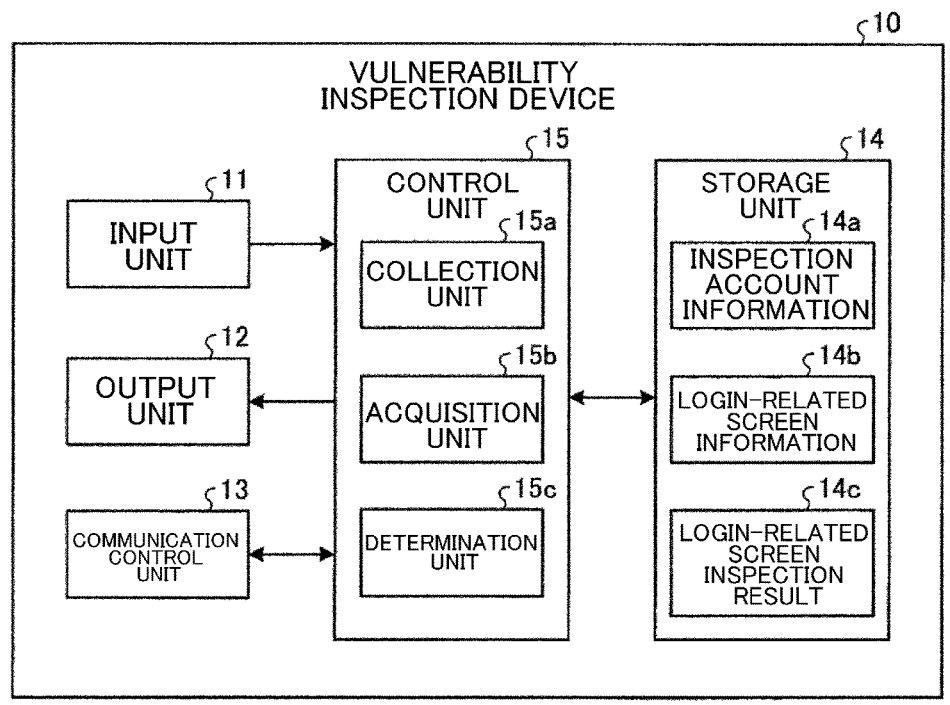
FIG. 1 is a schematic diagram illustrating a schematic configuration of a vulnerability inspection device of an embodiment.

Hereinafter, an embodiment of the present invention will be described in detail with reference to the drawings. Note that the present invention is not limited to this embodiment. Further, in the description of the drawings, like reference numerals denote like members.

[Vulnerability Inspection Device Configuration]

FIG. 1 is a schematic diagram illustrating a schematic configuration of a vulnerability inspection device of the present embodiment. As illustrated in FIG. 1, a vulnerability inspection device 10 of the present embodiment is realized by a general-purpose computer such as a personal computer, and includes an input unit 11, an output unit 12, a communication control unit 13, a storage unit 14, and a control unit 15.

The input unit 11 is realized using an input device such as a keyboard or a mouse, and receives various types of instruction information, such as a processing start instruction for the control unit 15, in accordance with input operations performed by an operator. The output unit 12 is realized by a display device such as a liquid crystal display, a printing device such as a printer, or the like. For example, the output unit 12 displays the result of vulnerability inspection processing described later.

The communication control unit 13 is realized by an NIC (Network Interface Card) or the like and controls communication between an external device and the control unit 15 via a telecommunication line such as a LAN (Local Area Network) or the Internet. For example, the communication control unit 13 controls communication between the control unit 15 and a service management device or the like that manages various types of information of an online service provider that is to be inspected.

The storage unit 14 is realized by a semiconductor memory element such as a RAM (Random Access Memory) or a flash memory (Flash Memory), or a storage device such as a hard disk or an optical disk. The storage unit 14 stores in advance a processing program for operating the vulnerability inspection device 10, data used during execution of the processing program, and the like, or temporarily stores such data each time processing is performed. Note that the storage unit 14 may be configured to communicate with the control unit 15 via the communication control unit 13.

In the present embodiment, the storage unit 14 stores inspection account information 14a, login-related screen information 14b, login-related screen inspection results 14c, and the like.

Specifically, the inspection account information 14a is information regarding accounts used for later-described vulnerability inspection processing. Here, FIG. 2 is a diagram illustrating the data configuration of the inspection account information 14a. As illustrated in FIG. 2, the inspection account information 14a includes account types, registration statuses, account information, valid formats, and values.

The account information is user information required when registering a new user ID in the account-based online service that is to be inspected. The account information includes an email address, a username, a telephone number, a name, a birthday, a gender, a location, or the like. The email address, username, telephone number, or the like included in the account information can be used as a user ID for identifying the account. Note that FIG. 2 illustrates a service in which an email address, which is currently common, is used as a user ID.

Also, the valid format is an input format for each record in the account information. FIG. 2 illustrates an example in which the valid format of an email address is text made up of 128 characters or less. Also, the value is the specific value of each account information record used for later-described vulnerability inspection processing, and FIG. 2 illustrates an example in which the email address "test_r@mail.service.co.jp" is used.

The account type is information indicating the registration status of the user ID in the online service that is to be inspected. Specifically, the account type is an account classification according to the registration status of the account represented by the registration status. In the present embodiment, as shown in FIG. 2, there are two account types, namely an unregistered account and a registered account. Specifically, the account type "unregistered account" has a registration status of "unregistered", and the account type "registered account" has a registration status of "registration complete".

Note that information that has not been previously used for registration in the online service that is to be inspected is applied as the values of the account information in the inspection account information 14a. Also, one of the account information pieces has been used as a user ID in order to register an account with the account type "registered account" in advance in the online service that is to be inspected. FIG. 2 illustrates the case where an email address has been registered as a user ID.

Also, the account type is not limited to the above-described classification indicating the presence or absence of registration. For example, the account type may be a classification indicating the presence or absence of a registration change or the presence or absence of a registration history. Specifically, the presence or absence of a registration change can be indicated by, for example, the category "unregistered account" or the category "account before registration change". Also, the presence or absence of a registration history can be indicated by, for example, the category "unregistered account" or the category "withdrawn account".

In the present embodiment, the inspection account information 14a is collected in advance via the input unit 11 or the communication control unit 13 and stored in the storage unit 14 prior to the vulnerability inspection processing described later. For example, a collection unit 15a, which will be described later, searches for account information and valid formats from the service management device or the like of the service provider of the online service that is to be inspected, and includes the found information in the inspection account information 14a.

The description will now return to FIG. 1. The login-related screen information 14b is information for specifying login-related screens, which are screens that include a form for inputting a user ID, in the online service that is to be inspected. Here, FIG. 3 is a diagram illustrating the data configuration of the login-related screen information 14b. As shown in FIG. 3, the login-related screen information 14b includes login-related screen types, URLs, and input account information.

The login-related screen type is information indicating the function provided by the corresponding screen, and is a type such as login, password recovery, new account registration, account recovery, or ID search. Each screen is identified by a URL. Also, the input account information is the account information that needs to be input in the corresponding screen.

For example, in the example shown in FIG. 3, in a password recovery circumstance such as password notification or reissuance, a screen identified by the URL "http://www.service.com/password_recovery" of the type "password recovery" appears. It is also shown that only the email address serving as the user ID needs to be input in this login-related screen.

In the present embodiment, the login-related screen information 14b is collected in advance via the input unit 11 or the communication control unit 13 and stored in the storage unit 14 prior to the vulnerability inspection processing described later. For example, the collection unit 15a collects the login-related screen information from the service management device or the like of the service provider of the online service that is to be inspected, creates the login-related screen information 14b, and stores it in the storage unit 14.

Note that the login-related screen information 14b is not limited to being stored in the storage unit 14, and may be collected when the vulnerability inspection processing is executed, for example. In this case, the collection unit 15a may collect the login-related screen information 14b prior to the later-described processing performed by the acquisition unit 15b, for example. Hereinafter, the individual records in the login-related screen information 14b will be referred to as login-related screens.

The description will now return to FIG. 1. The login-related screen inspection result 14c is the result of a determination for a corresponding login-related screen in the vulnerability inspection processing described later.

The control unit 15 is realized using a CPU (Central Processing Unit) or the like, and executes a processing program stored in a memory. As a result, the control unit 15 functions as the collection unit 15a, the acquisition unit 15b, and a determination unit 15c, as illustrated in FIG. 1. Note that these functional units may be individually or partially implemented with different pieces of hardware. Further, the control unit 15 may include other functional units.

The collection unit 15a collects account information and valid formats of the inspection account information 14a and the login-related screen information 14b from the service management device of the service provider of the online service that is to be inspected via the input unit 11 or the communication control unit 13, and stores the collected information in the storage unit 14.

Specifically, the collection unit 15a collects the account information and the valid format by referencing "input name" and "input type" in the "input" tag in the HTML of the new account registration screen of the online service that is to be inspected. For example, the collection unit 15a references the input tag <input type="text" value=" " maxlength="128" name=".em" id="em" class="emailtxtbox">, and collects the valid format "text up to 128 characters" for the account information "email address".

The collection unit 15a then stores, in the storage unit 14, inspection account information 14a created using the account information and the valid format that were collected. For example, the collection unit 15a further accepts the input of an account type, a registration status, and a value for account information via the input unit 11 or the communication control unit 13, creates the inspection account information 14a, and stores the created information in the storage unit 14.

Also, the collection unit 15a references "input name" in the input tag of the HTML of the screens of the online service that is to be inspected, and collects information indicating the screens in which the user ID is an input item. For example, the collection unit 15a searches for screens whose HTML includes "input name='em', 'email'", "input name='un', 'uname'", "input name='pn', 'phone'", or the like in accordance with whether the user ID is an email address, a username, or a telephone number in the service that is to be inspected. The collection unit 15a then creates login-related screen information 14b using the collected screen information, and stores the created information in the storage unit 14.

Note that the collection unit 15a may transfer the information to the acquisition unit 15b or the determination unit 15c instead of storing it in the storage unit 14. Further, the vulnerability inspection processing is not limited to being performed on a website, and may be performed on a mobile application provided by the online service that is to be inspected, for example.

The acquisition unit 15b acquires system messages that are displayed in response to input for multiple types of service registration statuses of a user ID that is input to a login-related screen that requires the input of a user ID in the account-based online service that is to be inspected.

Specifically, the acquisition unit 15b first references the login-related screen information 14b, selects a login-related screen of the online service that is to be inspected, and acquires the URL of the selected screen and the types of account information that need to be input. The acquisition unit 15b then references the inspection account information 14a, inputs values that correspond to the account information that needs to be input for the corresponding account type in the login-related screen, and acquires the system message that is displayed as a response to the input.

Note that at this time, in the case of the password for example, the acquisition unit 15b inputs a value that conforms to the valid format of the inspection account information 14a but is different from the inspection account information 14a. This is because it is envisioned that the attacker knows the email address, the username, the telephone number, or the like of the target user, but does not know the password, for example.

Figure 4:
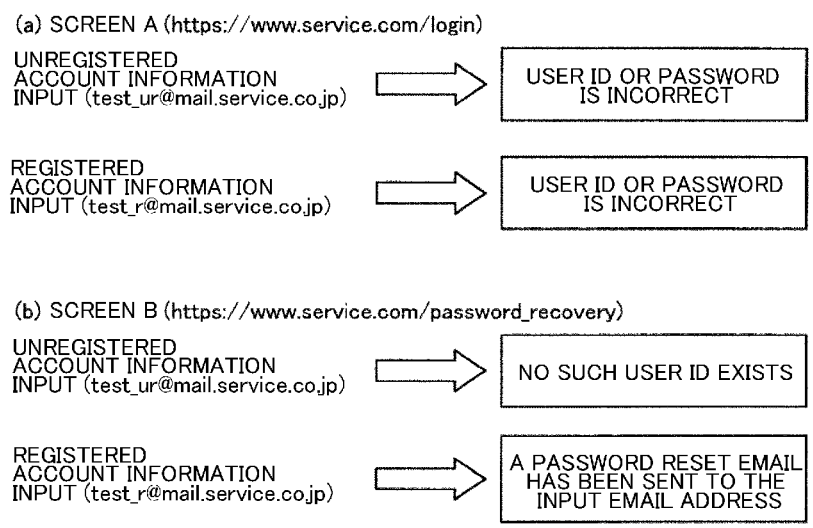
FIG. 4 is a diagram for describing processing of an acquisition unit.

Here, FIG. 4 is a diagram for describing processing performed by the acquisition unit 15b. FIG. 4 illustrates the case where the user ID is an email address. As shown in (a) of FIG. 4, the acquisition unit 15b accesses the URL "https://www.serivice.com/login" of the selected screen A, and first inputs the email address value "test_ur@mail.service.co.jp" as the user ID for the account type "unregistered account". The acquisition unit 15b then acquires the displayed system message "User ID or password is incorrect".

Similarly, the acquisition unit 15b inputs the email address value "test_r@mail.service.co.jp" as the user ID for the account type "registered account". The acquisition unit 15b then acquires the displayed system message "User ID or password is incorrect".

As shown in (b) of FIG. 4, the acquisition unit 15b then selects a different screen B, similarly inputs a user ID for each account type, and acquires the system messages that are displayed as a response to the input. In the example shown in (b) of FIG. 4, the acquisition unit 15b accesses the URL "https://www.serivice.com/password_recovery" of the other selected screen B, and inputs the value "test_ur@mail.service.co.jp" as the user ID (email address) for the account type "unregistered account". The acquisition unit 15b has acquired the displayed system message "No such user ID exists".

Similarly, the acquisition unit 15b inputs the value "test_r@mail.service.co.jp" as the user ID (email address) for the account type "registered account". The acquisition unit 15b has acquired the displayed system message "A password reset email has been sent to the input email address".

Note that the acquisition unit 15b may store the acquired system messages for the account types in the storage unit 14 in association with the login-related screen. In this case, for example, the acquisition unit 15b stores the system message for the account type "unregistered account" and the system message for the account type "registered account" in association with the type of login-related screen in the login-related screen inspection result 14c described later.

The description will now return to FIG. 1. The determination unit 15c uses the system messages that were acquired for the different account types to determine whether or not a login-related screen has a vulnerability regarding the leakage of user registration status.

Specifically, the determination unit 15c determines that there is a vulnerability if the system messages that were acquired for different account types are different, and determines that there is no vulnerability if the acquired system messages are the same.

Here, FIG. 5 is a diagram for describing the processing performed by the determination unit 15c. As shown in FIG. 5, the determination unit 15c references the system messages that were acquired by the acquisition unit 15b for the account types for the login-related screen, and determines that the login-related screen has a vulnerability regarding the leakage of user registration status if the system messages for different account types are different. This is because if the system messages that are displayed for an unregistered account and a registered account are different, the attacker can specify the registration status (unregistered or registered) of a target user based on the system message that is displayed upon inputting the personal information (e.g., email address) of the target user.

In the example shown in FIG. 5, the system message for "unregistered account" and the system message for "registered account" are different for the login-related screen of type "password recovery", and therefore the determination unit 15c determines that there is a vulnerability.

On the other hand, if the system messages for different account types are the same, the determination unit 15c determines that the login-related screen does not have a vulnerability regarding the leakage of user registration status. In the example shown in FIG. 5, the system message for an "unregistered account" and the system message for a "registered account" are the same for the login-related screen of the type "login", and therefore the determination unit 15c determines that a vulnerability.

The determination unit 15c stores the screen inspection results, which are the determination results for each login-related screen, in the storage unit 14 as the login-related screen inspection result 14c, as shown in FIG. 5.

Also, in the case of determining that all of the login-related screens of the service do not have a vulnerability, the determination unit 15c determines that the service does not have a vulnerability. Specifically, if the screen inspection result shown in FIG. 5 is "no vulnerability" for all of the login-related screens in the login-related screen information 14b for the online service that is to be inspected, the determination unit 15c determines that the online service does not have a vulnerability.

On the other hand, if the screen inspection result is "vulnerability" for even one screen among all of the login-related screens of the online service, the determination unit 15c determines that the online service has a vulnerability. This is because an attacker can specify the registration status of the service for the target user by using the login-related screen that has a vulnerability, and it cannot be said that the service is secure unless all of the login-related screens are secure and do not have a vulnerability.

The determination unit 15c also outputs the determination results for the online service that is to be inspected to an external device such as the service management device of the service provider via the output unit 12 or the communication control unit 13.

Vulnerability Inspection Processing

Figure 6:
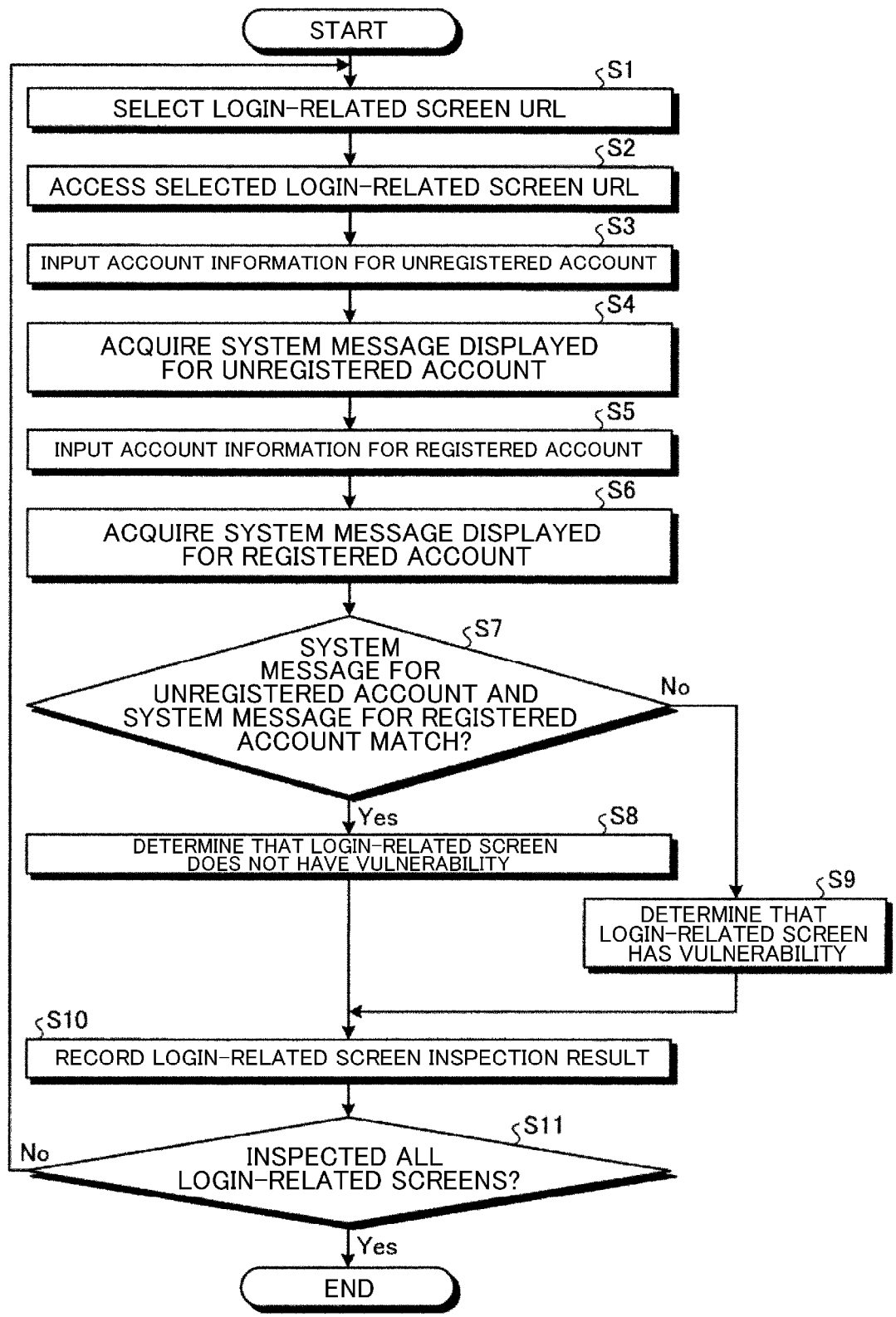
FIG. 6 is a flowchart showing a vulnerability inspection processing procedure.
Figure 7:
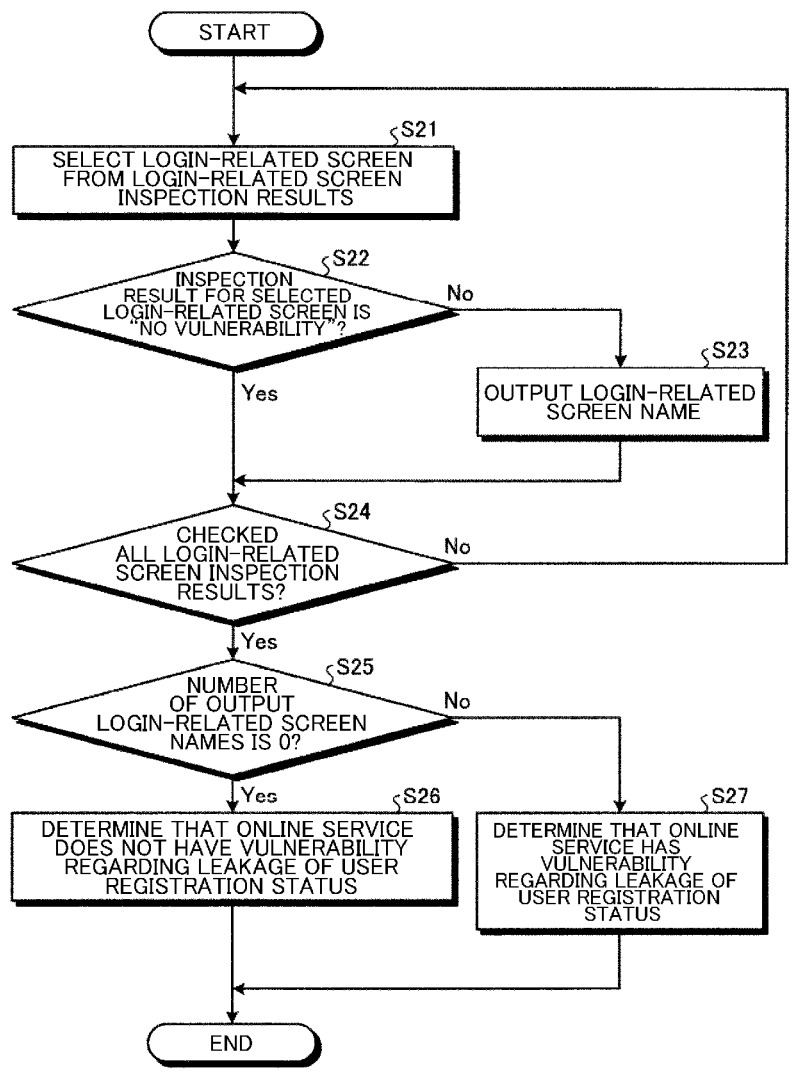
FIG. 7 is a flowchart showing a vulnerability inspection processing procedure.

Next, the vulnerability inspection processing performed by the vulnerability inspection apparatus 10 according to the present embodiment will be described with reference to FIGS. 6 and 7. FIGS. 6 and 7 are flowcharts showing a vulnerability inspection processing procedure. First, FIG. 6 shows a screen vulnerability inspection processing procedure performed for each login-related screen of the online service that is to be inspected. The flowchart of FIG. 6 is started at the timing when the inspector performs a start instruction operation, for example.

First, the acquisition unit 15b references the login-related screen information 14b, selects a login-related screen, and acquires the URL of the screen. The acquisition unit 15b then accesses the acquired URL (steps S1 to S2).

Next, the acquisition unit 15b inputs the account information of the account type "unregistered account" as the user ID, and acquires the system message that is displayed as a response to the input (steps S3 to S4).

The acquisition unit 15b then inputs the account information of the account type "registered account" as the user ID, and acquires the system message that is displayed as a response to the input (steps S5 to S6).

Next, the determination unit 15c checks whether or not the system message for the account type "unregistered account" and the system message for the account type "registered account" match each other (step S7). If they match (step S7, Yes), the determination unit 15c determines that there is no vulnerability related to that login-related screen (step S8). On the other hand, if they do not match (step S7, No), the determination unit 15c determines that there is a vulnerability related to that login-related screen (step S9).

Then, the determination unit 15c records the determination result for that login-related screen in the login-related screen inspection result 14c (step S10). If the determination unit 15c has not performed processing on all of the login-related screens (steps S11 and No), the determination unit 15c returns the processing to step S1 and repeats the above processing. On the other hand, if the determination unit 15c has performed processing on all of the login-related screens (step S11, Yes), the determination unit 15c ends this series of screen vulnerability inspection processing.

Next, FIG. 7 shows a vulnerability inspection processing procedure for the online service that is to be inspected. The flowchart of FIG. 7 is started at the timing when the inspector performs a start instruction operation, for example.

The determination unit 15c references the login-related screen inspection result 14c created by the screen vulnerability inspection processing shown in FIG. 6, selects a login-related screen, and checks the login-related screen inspection result for that login-related screen (steps S21 to S22).

If the screen inspection result for that login-related screen is that there is a vulnerability (step S22, No), the determination unit 15c outputs the screen name or the like of that login-related screen (step S23), and moves to the processing of step S24. On the other hand, if the screen inspection result of the login-related screen is that there is no vulnerability (step S22, Yes), the determination unit 15c moves to step S24 without performing the processing of step S23.

Next, if the determination unit 15c has not checked the screen inspection results of all of the login-related screens in the login-related screen inspection results 14c (steps S24 and No), the processing returns to step S21 and is repeated. On the other hand, if the screen inspection results have been checked for all of the login-related screens in the login-related screen inspection results 14c (step S24, Yes), the determination unit 15c calculates the number of login-related screens that were output in the processing of step S23 (step S25).

Then, if the number of login-related screens that were output is 0 (step S25, Yes), the determination unit 15c determines that the online service does not have a vulnerability regarding the leakage of user registration status (step S26). On the other hand, if the number of login-related screens that were output is not 0 (step S25, No), the determination unit 15c determines that the online service has a vulnerability regarding the leakage of user registration status (step S27).

The determination unit 15c also outputs the determination results for the online service that is to be inspected to an external device such as the service management device of the service provider via the output unit 12 or the communication control unit 13. This completes the series of vulnerability inspection processing.

As described above, in the vulnerability inspection device 10 of the present embodiment, the acquisition unit 15b acquires system messages that are displayed in response to input for multiple types of service registration statuses of a user ID that is input to a login-related screen that requires the input of a user ID in the account-based online service that is to be inspected. Also, the determination unit 15c uses the system messages that were acquired for the different account types to determine whether or not a login-related screen has a vulnerability regarding the leakage of user registration status.

For example, the determination unit 15c determines that there is a vulnerability if the system messages acquired for the different account types are different, and determines that there is no vulnerability if the system messages are the same.

As a result, it is possible to determine whether or not an attacker can input an acquaintance's email address or telephone number as a user ID and find out that the acquaintance is registered in the service, that is to say whether or not there is a risk of infringement of the acquaintance's (registered user's) privacy, for example.

It is also possible to determine whether or not there is a risk that an attacker can brute-force input arbitrary email addresses, usernames, and telephone numbers as user IDs, create a list of user IDs of registered users who are registered in the service, and guess passwords using the list.

Also, a registered user of the service can check whether or not there is a risk of the leakage of his/her registration status. In this way, according to the vulnerability inspection device 10 of the present embodiment, it is possible to appropriately determine whether or not a service has a vulnerability regarding the privacy threat that the registration status of registered users of the service may be leaked to a third party.

Also, in the case of determining that all of the login-related screens of the service do not have a vulnerability, the determination unit 15c determines that the service does not have a vulnerability. This makes it possible to more accurately determine whether or not a service has a vulnerability.

Also, the account types include categories among the presence/absence of registration, the presence/absence of a registration change, and the presence/absence of registration history. Accordingly, the vulnerability inspection device 10 can inspect whether or not there is a risk of leakage regarding not only whether a user is currently registered, but also registration statuses such as having changed their user ID, or having withdrawn from the service. Therefore, according to the vulnerability inspection device 10, it is possible to securely protect the registration status of registered users over all account life cycles, such as registered users, changed users, and withdrawn users.

Program

It is also possible to create a program in which the processing executed by the vulnerability inspection device 10 according to the above embodiment is described in a computer-executable language. As one embodiment, the vulnerability inspection device 10 can be implemented by installing a vulnerability inspection program that executes the above vulnerability inspection processing as package software or online software on a desired computer. For example, by causing an information processing device to execute the above-described vulnerability inspection program, the information processing device can function as the vulnerability inspection apparatus 10. The information processing device referred to here includes a desktop-type or notebook-type personal computer. Other examples of information processing devices include smartphones, mobile communication terminals such as mobile phones and PHS (Personal Handyphone System) devices, and slate terminals such as PDAs (Personal Digital Assistants). Further, the functionality of the vulnerability inspection device 10 may be implemented in a cloud server.

Figure 8:
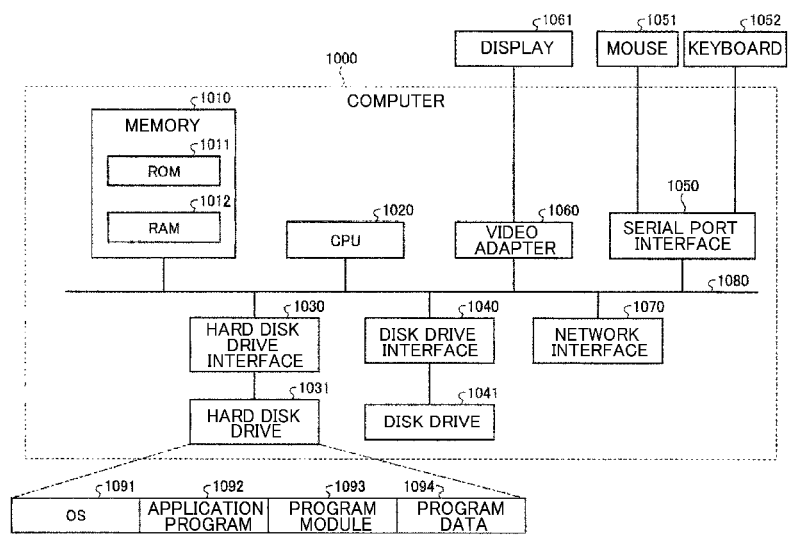
FIG. 8 is a diagram showing an example of a computer that executes a vulnerability inspection program.

FIG. 8 is a diagram showing an example of a computer that executes the vulnerability inspection program. A computer 1000 has a memory 1010, a CPU 1020, a hard disk drive interface 1030, a disk drive interface 1040, a serial port interface 1050, a video adapter 1060, and a network interface 1070, for example. These parts are connected by a bus 1080.

The memory 1010 includes a ROM (Read Only Memory) 1011 and a RAM 1012. The ROM 1011 stores a boot program such as a BIOS (Basic Input Output System), for example. The hard disk drive interface 1030 is connected to the hard disk drive 1031. The disk drive interface 1040 is connected to the disk drive 1041. A removable storage medium such as a magnetic disk or an optical disk is inserted into the disk drive 1041. A mouse 1051 and a keyboard 1052 or the like are connected to the serial port interface 1050. A display 1061 or the like is connected to the video adapter 1060.

Here, the hard disk drive 1031 stores an OS 1091, an application program 1092, a program module 1093, and program data 1094, for example. The information described in the above embodiment is stored in the hard disk drive 1031 or the memory 1010, for example.

The vulnerability inspection program is stored in the hard disk drive 1031 as, for example, the program module 1093 in which instructions executed by the computer 1000 are described. Specifically, the program module 1093 that describes the processing executed by the vulnerability inspection device 10 described in the above embodiment is stored in the hard disk drive 1031.

Also, data used in information processing performed by the vulnerability inspection program is stored as the program data 1094 in the hard disk drive 1031, for example. The CPU 1020 reads out the program module 1093 and the program data 1094 stored in the hard disk drive 1031 to the RAM 1012 as needed, and executes the above-described procedures.

Note that the program module 1093 and program data 1094 pertaining to the vulnerability inspection program are not limited to the case of being stored in the hard disk drive 1031, and as another example, they may be stored in a removable storage medium and read out by the CPU 1020 via the disk drive 1041 or the like. Alternatively, the program module 1093 and program data 1094 pertaining to the vulnerability inspection program may be stored in another computer that is accessible via a network such as a LAN or a WAN (Wide Area Network), and be read out by the CPU 1020 via the network interface 1070.

Although an embodiment to which the invention made by the inventor(s) is applied has been described above, the present invention is not intended to be limited by the description and the drawings that form a part of the disclosure of the present invention according to the present embodiment. In other words, all other embodiments, examples, operational techniques, and the like made by those skilled in the art based on the present embodiment are included in the scope of the present invention.

REFERENCE SIGNS LIST

10 Vulnerability inspection device
11 Input unit
12 Output unit
13 Communication control unit
14 Storage unit
14*a* Inspection account information
14*b* Login-related screen information
14*c* Login-related screen inspection result
15 Control unit
15*a* Collection unit
15*b* Acquisition unit
15*c* Determination unit

The invention claimed is:

1. A vulnerability inspection device of an online service, comprising:
a memory; and
a processor coupled to the memory and programmed to execute a process comprising:
acquiring first and second system messages for display in response to transmitting, to a server of the online service, first and second inputs to first and second login-related screens,
wherein the first and second inputs respectively represent first and second user identifiers,
the first and second user identifiers respectively correspond to first and second types of service registration statuses of a plurality of types of service registration statuses of one or more users,
the first and second login-related screens correspond to distinct login-related functions of the online service,
the first and second system messages respectively correspond to the first and second types of service registration statuses, and
the online service receives a user identifier for login; and
determining, based on matching the acquired first and second system messages, a vulnerability of the first and second login-related screens of the online service for leakage of user registration status information.

2. The vulnerability inspection device according to claim 1,
wherein the determining further comprises determining that the vulnerability exists when the first and second system messages are distinct from each other, and
the determining further comprises determining that the vulnerability does not exist the first and second system messages are not distinct.

3. The vulnerability inspection device according to claim 2,
wherein, when none of the first and second login-related screens and other login-related screens of a plurality of login-related screens of the online service indicates the vulnerability, the processor further executes a process comprising determining that the online service does not have the vulnerability.

4. The vulnerability inspection device according to claim 1,
wherein the first type indicates either one of
presence of user registration,
absence of the user registration,
presence of a registration change,
absence of the registration change,
presence of registration history, or
absence of the registration history.

5. A vulnerability inspection method for execution by a vulnerability inspection device, the method comprising:
an acquiring step of acquiring first and second system messages for display in response to transmitting, to a server of the online service, first and second inputs to first and second login-related screens,
wherein the first and second inputs respectively represent first and second user identifiers,
the first and second user identifiers respectively correspond to first and second types of service registration status of a plurality of types of service registration statuses of one or more users,
the first and second login-related screens correspond to distinct login-related to functions of the online service,
the first and second system messages respectively correspond to the first and second types of service registration statuses, and
the online service receives a user identifier for login; and
a determination step of determining, based on matching the acquired first and second system messages, a vulnerability of the first and second login-related screens of the online service for leakage of user registration status information.

6. A non-transitory computer-readable recording medium having stored a vulnerability inspection program for causing a computer to execute:
an acquiring step of acquiring first and second system messages for display in response to transmitting, to a server of the online service, first and second inputs to first and second login-related screens,
wherein the first and second inputs respectively represent first and second user identifiers,
the first and second user identifiers respectively correspond to first and second types of service registration statuses of a plurality of types of service registration statuses of one or more users,
the first and second login-related screens correspond to distinct login-related functions of the online service,
the first and second system messages respectively correspond to the first and second types of service registration statuses, and
the online service receives a user identifier for login; and
a determining step of determining, based on matching the acquired first and second system messages, a vulnerability of the first and second login-related screens of the online service for leakage of user registration status information.

7. The vulnerability inspection device according to claim 1, wherein the plurality of types of user registration statuses respectively indicates whether a user identifier is registered in the online service, and the plurality of types of user registration statuses comprise one or more of:
  unregistered,
  registered,
  previously registered and changed, or
  withdrawn.

8. The vulnerability inspection device according to claim 1, wherein the first screen represents a function of at least one of:
  login to the online service,
  password recovery,
  new account registration,
  account recovery, or
  search for a user identifier.

* * * * *